(12) United States Patent
Edgren

(10) Patent No.: US 6,421,046 B1
(45) Date of Patent: Jul. 16, 2002

(54) CONTROL PANEL

(75) Inventor: Claes Edgren, Trollhättan (SE)

(73) Assignee: SAAB Automobile AB (SE)

( * ) Notice: Subject to any disclaimer, the term of this patent is extended or adjusted under 35 U.S.C. 154(b) by 0 days.

(21) Appl. No.: 09/555,002

(22) PCT Filed: Nov. 23, 1998

(86) PCT No.: PCT/SE98/02121

§ 371 (c)(1),
(2), (4) Date: May 22, 2000

(87) PCT Pub. No.: WO99/30221

PCT Pub. Date: Jun. 17, 1999

(30) Foreign Application Priority Data

Nov. 25, 1997 (SE) .............................................. 9704336

(51) Int. Cl.$^7$ ................................................ G09G 5/00
(52) U.S. Cl. ........................ 345/168; 345/173; 345/184; 345/905; 340/691.1; 340/691.6; 340/901
(58) Field of Search ................................. 345/156, 157, 345/160, 168–173, 184, 905; 74/555, 612; 200/332.1, 332.2, 338; 220/338; 16/328, 330; 340/901, 691.1, 691.6

(56) References Cited

U.S. PATENT DOCUMENTS

| | | | | |
|---|---|---|---|---|
| 5,126,724 A | * | 6/1992 | Feuerlein et al. | 248/918 |
| 5,216,411 A | * | 6/1993 | Ashitomi et al. | 341/23 |
| 5,572,239 A | * | 11/1996 | Jaeger | 341/23 |
| 5,577,422 A | | 11/1996 | Beck et al. | 74/612 |
| 5,774,115 A | * | 6/1998 | Jaeger et al. | 345/172 |
| 6,037,954 A | * | 3/2000 | McMahon | 345/169 |

* cited by examiner

Primary Examiner—Richard Hjerpe
Assistant Examiner—Henry N. Tran
(74) Attorney, Agent, or Firm—Ostrolenk, Faber, Gerb & Soffen, LLP

(57) ABSTRACT

A control panel, in particular for motor vehicles, has a screen (3) and, arranged on the latter, a number of control elements (4) for controlling the function of works units which are connected to the control panel. A first group (5) of control elements can be moved relative to the screen (3) between a first position over the screen and a second position alongside the screen. In the first position, the screen is divided up into separate fields (9, 10) with different display information, and in the second position the whole screen forms a single field. It is possible to switch between these field divisions by moving the first group (5) of control elements between the said positions.

10 Claims, 2 Drawing Sheets

CONTROL PANEL

TECHNICAL FIELD

The invention relates to a control panel, with a screen and a number of control elements arranged on the latter for controlling the function of work units which are connected to the control panel.

PRIOR ART

Modern cars are being developed with an increasing number of functions for information, radio, telephone, navigation systems, telematics, etc. This places increased demands on space around the driver's seat area. To create space for these functions and at the same time to retain a comfortable driving environment and satisfy the requirements on storage space, the trend is to incorporate a large number of functions in a so-called multifunction panel.

To obtain a user-friendly interface for the driver, it is advantageous for the air-conditioning controls to be separate from the other controls. This is normally done by designing a control panel exclusively for air-conditioning functions, while a second control panel is used for controlling other functions. Both these types of control panels can be made relatively small and generally have a monochrome screen.

For high-specification cars, there is an increasing demand for functions which require that a colour screen is made available at the driver's seat. Examples of these functions are navigation systems with map, certain services in digital radio, internet services, instruction manuals and travel guides on CD-ROM. Such functions are generally used for short periods and often when the car is stationary. To achieve good functioning, the screen in these cases needs to be relatively large, which means that it creates a somewhat overbearing impression.

Since a screen of this type does not need to be in constant use, it has been proposed that it can be moved in and out of the instrument panel by means of relatively complicated mechanics. This is a common solution in post-assembly and has the advantage that the available panel surface area is well utilized. However, a disadvantage is that the mechanics are complicated and easily damaged. A pull-out screen may also cause problems in terms of safety in the event of a crash. In addition, the screen, in the pull-out position, can easily conceal some other feature on the instrument panel.

A more common solution is to have a fixed screen, often integrated with the radio. Such a solution has a robust and integral appearance, but a disadvantage is that the central console in the vehicle is dominated by a large colour screen, which takes up a lot of space and appears unnecessarily large in normal operation. In addition, extra space is needed for air-conditioning controls and displays in order for the climate control functions to be separate from other functions.

OBJECT OF THE INVENTION

The object of the invention is to make available a control panel which, while occupying a limited space, provides room for the control of many different functions, but which is nevertheless simple and user-friendly. Another object is to permit a robust design which is safe in the event of a crash.

DESCRIPTION OF THE INVENTION

The object of the invention is achieved by means of a design having the features according to the invention. By making a group of control members movable relative to the screen, the latter can easily be switched to different display modes without increased space being required. The control members can additionally be placed simply in such a way that a user-friendly layout is obtained with these movable control elements in different positions.

By virtue of the chosen design of the control panel, the advantage is also obtained that one and the same space in the instrument panel can be used for a simpler type of control panel in which instead of a large, divisible screen, two separate smaller screens are used which are placed one above the other, for example. This makes it easy to change; the vehicle's specification level without the actual instrument panel needing to be changed.

Further advantages and features of the invention will be evident from the attached description and from the other patent claims.

DESCRIPTION OF EMBODIMENTS

Figure 1:
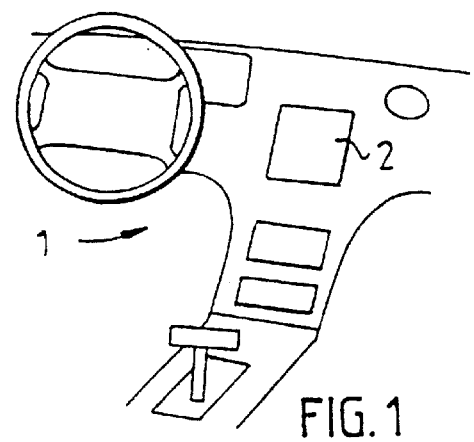
FIG. 1 is a diagrammatic representation of a driver's seat area in a motor vehicle, with a control panel according to the invention.

According to FIG. 1, a driver's seat area 1 in a motor vehicle is equipped with a control panel 2 which is designed according to the invention and by means of which the driver can control functions of certain work units included in the vehicle. Examples of these work units are the vehicle's climate control system, the radio with associated music system, a telephone, etc. These functions can also cover some forms of travel data, an electronic map, navigation system or the like.

Ease of control demands the use of relatively large equipment, but at the same time it is desirable, for reasons of space inside the vehicle, to have a large number of functions accommodated in a limited space.

Figure 2:
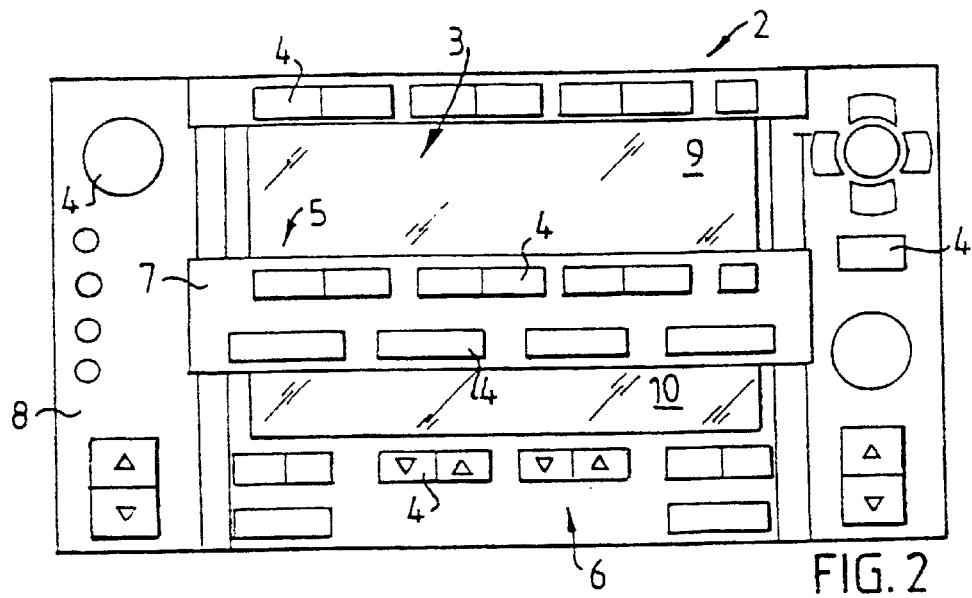
FIG. 2 shows a front view of a control panel according to the invention, in a state with the screen divided up into two separate fields.
Figure 3:
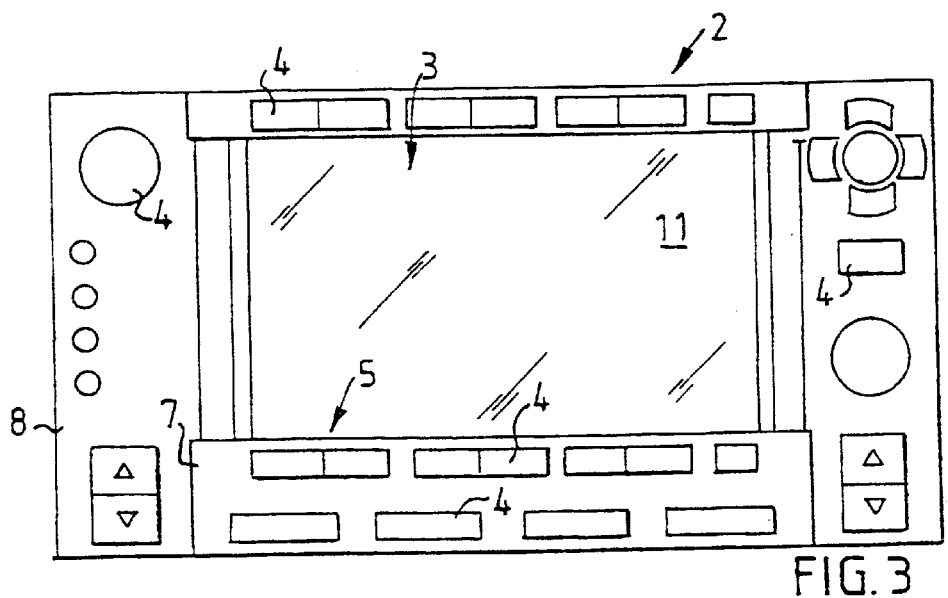
FIG. 3 shows a view corresponding to that in FIG. 2; but with the whole screen free.

A control panel 2 designed according to the invention is shown in more detail in FIGS. 2 and 3. On a screen 3 there are a number of control elements for controlling the function of different work units which are connected to the control panel. Some of these control elements have been provided here with the reference number 4 and can consist of keys, knobs or other suitable elements. The aim is to use the screen 3 to display information which relates to the function which has been selected for the various work units via the control elements 4.

According to the invention, a first group 5 of control elements 4 can be moved relative to the screen 3 between a first position over the screen 3, as shown in FIG. 2, and a second position alongside the screen, as shown in FIG. 3, where it at least partially covers a second group 6 (shown in FIG. 2) of control elements 4 situated at the bottom, i.e. alongside or outside the screen 3, and at the same time leaves the screen 3 entirely free. Movement of the first group 5 of control elements 4 is made possible by these control elements being mounted on a support 7 which can be displaced over the screen 3 and which at least at one of its ends, but expediently at both ends, is mounted so that it can be displaced on the frame 8 surrounding the screen 3.

In the first position of the first group 5 of control elements 4, as shown in FIG. 2, the support 7 and its control elements divide the screen 3 up into two separate fields 9 and 10 with different display information. In the second position of the first group of control elements 4, as shown in FIG. 3, the screen 3 by contrast forms a single continuous field 11 which has other display information than the fields 9 and 10.

The field 9 can advantageously be used for controlling the radio, telephone, etc., while the field can advantageously be used for controlling air-conditioning functions, e.g. the setting of an automatic climate control (ACC) system. In each case, suitably positioned and shaped control elements 4 can be used for the required setting possibilities. Thus, for example, the upper row of control elements 4 in the first group 5 can be used for the field 9, while the lower row in the same group 5 can be used for the field 10.

After moving the support 7 with the first group 5 to the second position in FIG. 3, the upper row of control elements 4 in this group 5 can be used for the field 11, while the lower row in the same group 5 can retain its earlier function belonging to the climate control system and the field 10. It is advantageous in this case if each control element 4 is provided with a suitable symbol which clearly indicates its function, e.g. engagement of automatic position, blowing air in direction of windscreen, activation of heat element in rear window, etc. In this way it is possible to control important functions of the climate control system regardless of how the screen 3 is being used.

The screen halves 9 and 10 can advantageously be monochrome, but it is generally desirable for the field 11, i.e. full screen status, to be a colour field. The screen 3 should therefore preferably be a colour screen.

The field 11 can be used, for example, for map navigation, internet services, displaying the vehicle manual, travel books, etc. When this field is in use, the vehicle is often advantageously stationary so that the driver is able to study the picture in detail and change the display in the desired way. The associated control elements 4 do not therefore normally need to be as large and as simply shaped as those control elements which require to be used during driving and they can therefore advantageously be placed where they are not in the way of those control elements which are needed during driving. In the embodiment shown, this type of control element has been grouped to the right and to the left of the screen.

The screen 3 is switched between the positions according to FIGS. 2 and 3 in a simple way by taking hold of the support 7 which for this purpose can be designed with a suitable grip, for example at the centre or at one of the ends. The support 7 should be easy to fix in the position shown in FIG. 2, for which reason there should be some form of locking arrangement at least at one end of the support 7, for example in the form of a simple snap-in lock which holds the support 7 in the intended position.

The design can also be such that the support 7, when it is pressed down from an upper position to a lower position, tensions a spring arrangement, the force from this being used to move the support upwards again. This force can be released, for example, by a lock being disengaged when an upward movement of the support 7 is desired.

Another possibility is to couple the support 7 to a motor which moves the support between different positions. The movement can be activated, for example, manually by manoeuvring a special control element, or automatically via the radio, for example. In the latter case, a traffic report, for example, can change the display function so that the navigation computer can show an alternative route to avoid traffic jams which have developed as a result of an accident.

The embodiment described above can of course be modified in various ways, for example by changing the fields 9 and 10 around and instead moving the support 7 upwards from the position shown in FIG. 2, with associated rearrangement of the control elements. The support 7 can also be placed vertically or in another way, and it can be given a shape other than the one which has been shown here. The support 7 does not necessarily need to be mounted at both ends, and it may instead be adequate to mount it at one end.

Signal transmission from the control elements 4 included in the first group 5 can take place via transmission members in the form of, for example, wires or switches at one or both ends of the support 7. With the aid of wires, the control elements 4 can, for example, at all times have contact with screen and work units, while it is possible, for example with switches, to have engagement only in the positions shown in FIGS. 2 and 3.

Figure 4:
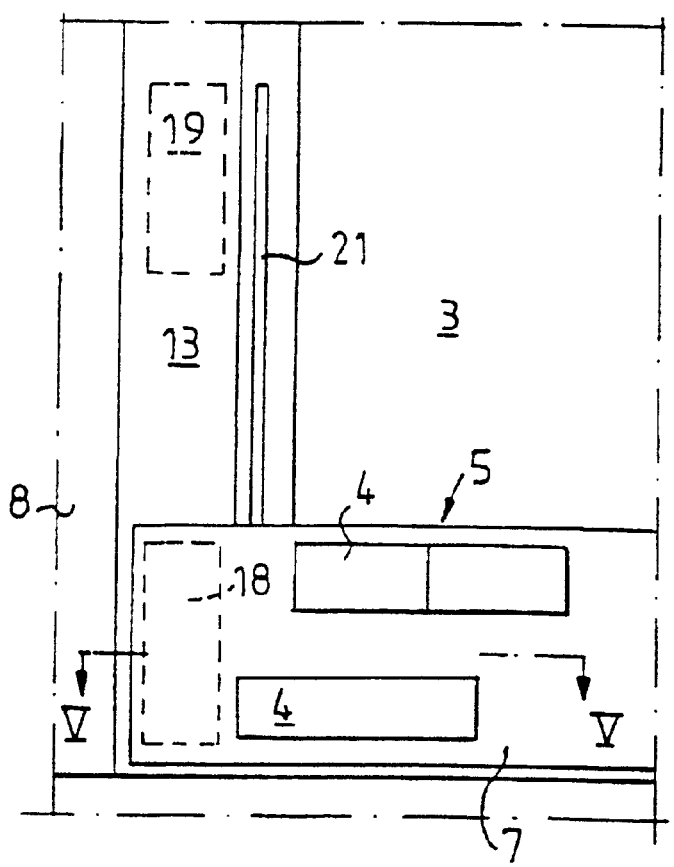
FIG. 4 shows a detail from FIG. 3.
Figure 5:
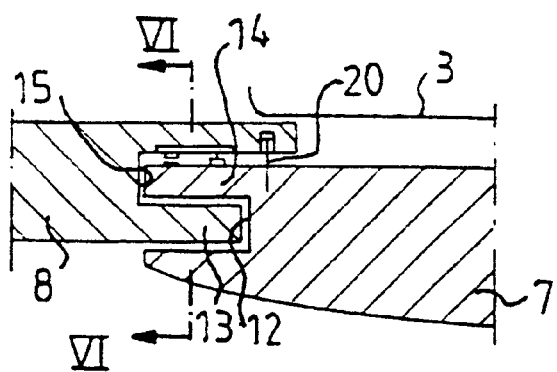
FIG. 5 shows a section V—V in FIG. 4.
Figure 6:
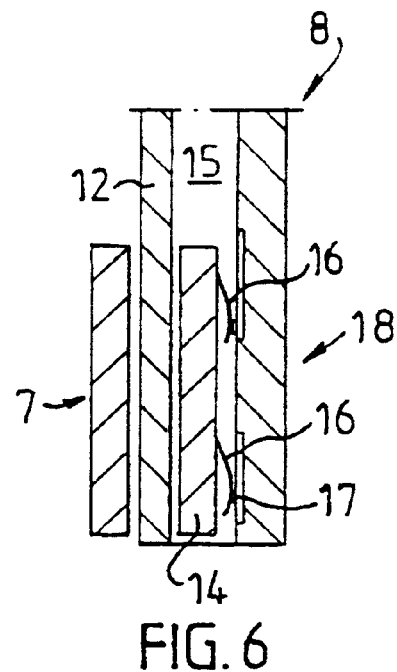
FIG. 6 shows a section VI—VI in FIG. 5.

FIGS. 4–6 show in greater detail how the support 7 can be designed and mounted. At the end of the support 7 there is a vertical guide track 12 in which a vertical guide edge 13 on the frame 8 engages. On the rear of the support 7 there is a rear projection 14 which reaches into a vertical track 15 arranged in the frame 8 beside the guide edge 13. On the side of the rear projection 14 facing the screen 3 there are contact members 16 for cooperating with contact members 17 on the frame 8. On the frame 8 there is a lower set 18 of contact members 17, intended for cooperation with the support 7 in the lower position, and an upper set 19 of contact members 17, intended for cooperation with the support 7 in the upper position.

The contact members 16, which can, for example as here, be designed as sliding contacts, are connected to the first group 5 of control elements 4 arranged on the support 7, the number of contact members being dependent on the number of control elements 4 and their functions.

In the illustrated embodiment, the control elements 4 on the support 7 are not in communication with their work units during the movement between the positions shown in FIGS. 2 and 3. This's gives a robust and simple design. However, if so required, continuous connection can be maintained with the aid of, for example, a flexi film which runs with the support 7 during the movement of the latter, in which case the contact members 16 and 17 can be omitted.

On the rear side of the support 7 there is a projecting guide device 20, for example in the form of an edge or two pins. This guide device 20 runs in a track 21 in the frame 8. In this way, an improved guidance of the support 7 is achieved, so that it is prevented from wedging fast if loaded obliquely during movement. A corresponding arrangement can be provided at the opposite end of the support 7. If need be, there can also be contact members 16, 17 or equivalent at this other end.

The engagement between the frame 8 and the support 7 can of course be designed in another way than that shown here. If appropriate, the mounting of the support 7 can be made easier by the said support being designed with a front part and a rear part which are snapped together or joined in another way once they have been moved into place on the frame 8.

What is claimed is:

1. Control panel, with a screen (3) and a number of control elements (4) arranged on the latter for controlling the function of work units which are connected to the control panel, information related to the function which has been selected for the work units via the control elements being displayed on the screen, characterized in that a first group (5) of control elements can be moved relative to the screen (3) between a first position essentially over the screen and a second position alongside the screen, in that in the first position the screen (3) is divided up into separate fields (9, 10) with different display information, in that in the second position the whole screen forms a single field (11) with predetermined display information, and in that it is possible to switch between these field divisions by moving the first group (5) of control elements between the first and second position, and vice versa.

2. Control panel according to claim 1, characterized in that the first group (5) of control elements is arranged on a support (7) which can be displaced across the screen and which is arranged to delimit a first field (9) and a second field (10) from each other in the first position of the first group (5) of control elements.

3. Control panel according to claim 2, characterized in that the support (7) is elongate and extends across the screen (3), and in that its two end parts are mounted in such a way that it can be displaced in a direction transverse to its longitudinal direction.

4. Control panel according to claim 3, characterized in that the longitudinal direction of the support (7) is horizontal.

5. Control panel according to claims 2, characterized in that the support (7) can be locked in at least the position it is in when the first group (5) of control elements is in its first position.

6. Control panel according to claim 5, characterized in that the screen, in the position in which it shows a single field (11), is preferably arranged for map display.

7. Control panel according to claim 1, characterized in that the first group (5) of control elements is arranged, in its second position, to at least partially cover a second group (6) of control elements situated alongside the screen (3) and, in its first position, to leave the second group of control elements free.

8. Control panel according to claim 1, characterized in that the first group (5) of control elements is arranged, in its second position, to act on the screen's single field (11) and, in its first position, to act at least on one of the two fields (9, 10) into which the screen is divided in this position.

9. Control panel according to claim 1, characterized in that it is intended for the instrument panel in a motor vehicle, and in that one (10) of the two fields of the screen, when the screen is divided up into separate fields (9, 10), shows settings in the vehicle's climate control system.

10. Control panel according to claim 9, characterized in that the second (9) of the two fields of the screen, when the screen is divided up into separate fields (9, 10), shows settings in the vehicle's sound system.

* * * * *